(12) United States Patent
Holehan

(10) Patent No.: US 6,337,918 B1
(45) Date of Patent: Jan. 8, 2002

(54) COMPUTER SYSTEM WITH INTEGRATABLE TOUCHPAD/SECURITY SUBSYSTEM

(75) Inventor: Steven D. Holehan, Spring, TX (US)

(73) Assignee: Compaq Computer Corporation, Houston, TX (US)

( * ) Notice: Subject to any disclaimer, the term of this patent is extended or adjusted under 35 U.S.C. 154(b) by 0 days.

(21) Appl. No.: 08/743,109

(22) Filed: Nov. 4, 1996

(51) Int. Cl.[7] .................................................. G06K 9/00
(52) U.S. Cl. ........................ 382/124; 345/145; 345/175
(58) Field of Search ................................ 382/124, 115; 345/145, 173, 175, 176; 340/825.34; 348/169

(56) References Cited

U.S. PATENT DOCUMENTS

| 5,229,764 A | * | 7/1993 | Matchett et al. ....... 340/825.34 |
| 5,420,936 A | * | 5/1995 | Fitzpatrick et al. ......... 382/124 |
| 5,479,528 A | * | 12/1995 | Specter ....................... 382/115 |
| 5,488,575 A | | 1/1996 | Danielson ................... 364/707 |
| 5,530,456 A | * | 6/1996 | Kokubo ...................... 345/175 |
| 5,703,356 A | * | 12/1997 | Bidiville et al. ............ 345/165 |
| 5,707,160 A | * | 1/1998 | Bowen ....................... 345/157 |

* cited by examiner

Primary Examiner—Christopher S. Kelley
(74) Attorney, Agent, or Firm—Conley, Rose & Tayon, P.C.

(57) ABSTRACT

A personal computer system includes a touchpad having an infrared source and an infrared detector such that said touchpad may implement an infrared fingerprint security system and/or an infrared touchpad for cursor control. The infrared fingerprint security system may provide information necessary to gain access to peripheral storage media. For example, a peripheral storage medium may have a database which contains information about the fingerprints of authorized users such that the storage medium may only be accessed by authorized users in ways permitted for each particular user as indicated in the storage medium itself. A user may input information through a touch sensitive light pen which generates an infrared beam. The implementation of both a fingerprint security system and a touchpad cursor control with common elements is advantageous since both enhanced capabilities may thereby be provided at a reasonable cost.

23 Claims, 3 Drawing Sheets

COMPUTER SYSTEM WITH INTEGRATABLE TOUCHPAD/SECURITY SUBSYSTEM

FIELD OF INVENTION

This invention relates generally to personal computers and particularly to personal computer security and cursor control subsystems.

BACKGROUND OF THE INVENTION

A variety of cursor control systems are currently used on personal computers. The most common cursor control system is the so-called mouse, but many computer systems use touchpad cursor control systems. Touchpads commonly use capacitive sensors to detect the position of the user's finger and to allow the user to control cursor position by moving the user's finger on the touchpad.

The security of both data and hardware is becoming an increasing concern of personal computer users. Data security involves protecting information stored on the computer from unauthorized users. Many computers are available to a number of users. Any person who can gain access to a facility may, in some instances, be able to use a particular personal computer in that facility, regardless of whether the person is authorized to access all of the data stored in that personal computer. Moreover, many personal computers are operated by a number of users. Some users may wish to keep certain information confidential from other users.

Hardware security relates to the protection of the personal computer and its peripheral components from theft. The problem of theft of personal computers and their components is increasing, apparently because these devices are very portable and therefore may easily be concealed and transported.

The problem is particularly acute with respect to a variety of peripheral components which are advantageously made to be easily removable or disconnectable from the personal computer system. For example, hard disk drives and floppy disk drives may all contain information which is very sensitive and these devices can be separated, in many instances, from the computer system and utilized by unauthorized persons at other locations. The owner is thereby exposed to risk of hardware loss and data security breach.

There is currently some interest in fingerprint identification technology for personal computers. For example, a product called FingerLock allows a user to gain access to a portable computer by placing his or her finger on a platen so that fingerprint identification data, called "minutia", may be collected and analyzed. This system apparently uses capacitive sensors to analyze the user's fingerprint. While there is a considerable demand for this type of subsystem, the cost of such subsystems may be prohibitive at current levels.

Thus, there is a demand for improved fingerprint security systems which are capable of being implemented at reasonable cost. There is also a demand for economical cursor control systems, including touchpad cursor control systems.

SUMMARY OF THE INVENTION

A personal computer system may include a processor and a memory connected to one another. A keyboard is connected to the processor. A touchpad on the keyboard includes a substantially infrared transparent touchpad surface, a source of infrared light, and a detector of infrared light. The source is arranged to direct infrared light through the touchpad surface from below and the detector is arranged to detect infrared light reflected from the surface when an object is placed on the surface. The detector is connected to the processor such that the processor may analyze information about the object placed on the touchpad.

In accordance with another aspect of the present invention, an infrared detector may be utilized to analyze and record information about the user's fingerprint. This information can then be used to control access to the computer system and peripheral resources. In this way, both data and hardware security may be enhanced.

In accordance with still another aspect of the present invention, an infrared detector may be provided for determining the location of a user's finger on a touchpad surface. The infrared information can be used to allow the user to control the position of a cursor.

In accordance with yet another aspect of the present invention, infrared detectors may be utilized to implement both an infrared based touchpad sensor and a fingerprint security system. The infrared technology can provide two distinct benefits without substantially increased costs for the combined benefits. As a result, both fingerprint security and infrared touchpad technology may be made practical for incorporation into personal computers.

In accordance with still another aspect of the present invention, a computer system having a security subsystem may include a processor with a memory connected to the processor. A first device is provided for inputting the user identification information. A storage medium stores user identification information. A second device is connected to the first device for comparing the inputted user identification and the stored information to determine if the inputted user identification information matches the stored user identification information. A removable device is connectable to the processor. The device has a memory for storing user identification information and a controller adapted to determine whether to allow access to the device based on the inputted user identification information.

In accordance with another aspect of the present invention, an infrared input device for a personal computer system includes a pen-shaped housing with a tip. A source of infrared light contained in the housing is arranged to produce a beam of infrared light from the tip of the housing. A switch at the tip of the housing is adapted to activate the source of infrared light when the tip is in contact with a surface. In this way, the input device produces a beam of infrared light through the tip when the tip is in contact with a surface.

In accordance with yet another aspect of the present invention, a computer system includes a sensor capable of sensing both the position of a user's finger on a surface and the characteristics of the user's fingerprint. A cursor control controls the position of a cursor. The cursor control is connected to the sensor for receiving information about the location of the user's finger on the surface. A fingerprint analyzer is connected to the sensor as well. The analyzer receives information from the sensor about the characteristics of the user's fingerprint.

In accordance with still another aspect of the present invention, a method of inputting information to a computer system includes the step of causing a beam of infrared light to be reflected from a user's finger positioned on a surface. The reflected infrared light is analyzed to determine both the location of the user's finger on the surface and the characteristics of the user's fingerprint. The position of a cursor is controlled based on the finger location information and access to the computer system is controlled based on the fingerprint information.

DESCRIPTION OF A PREFERRED EMBODIMENT

Figure 1:
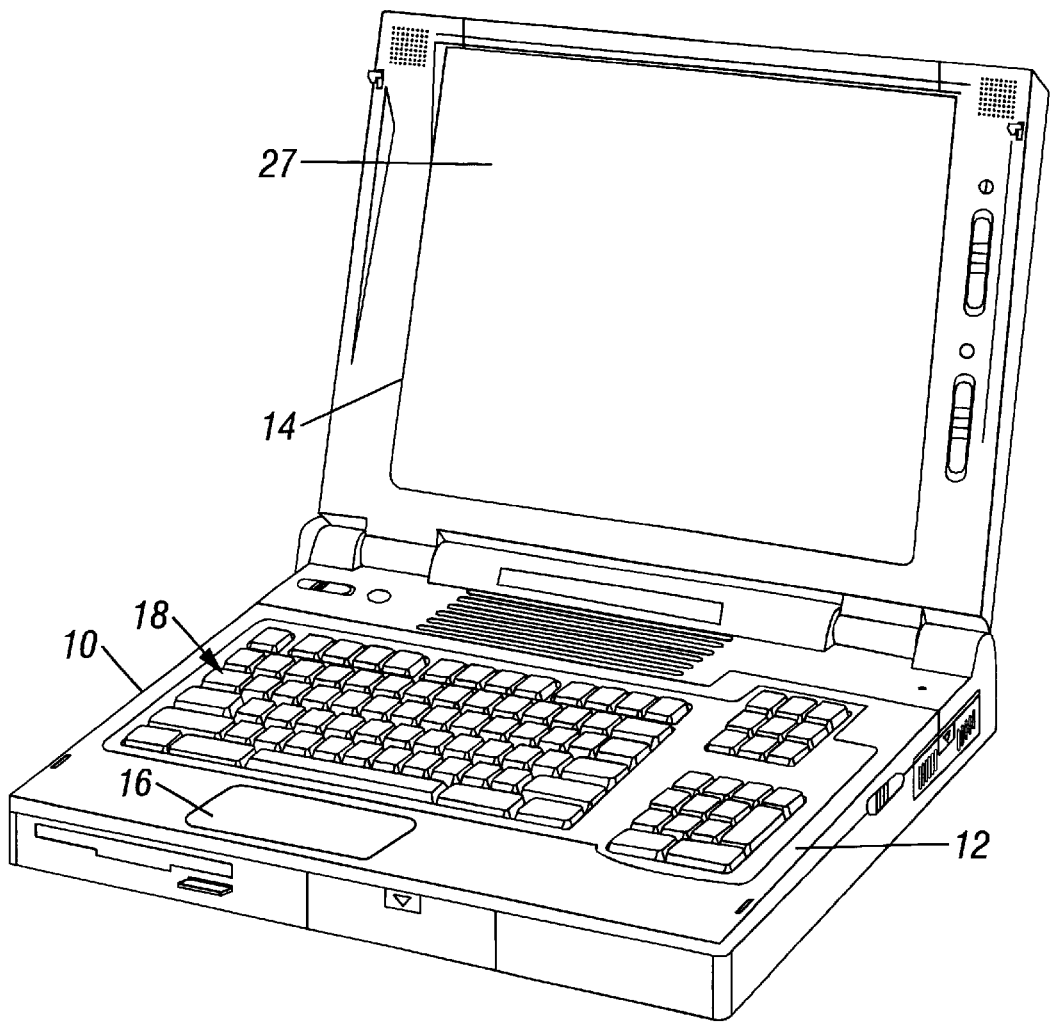
FIG. 1 is a perspective view of a personal computer in accordance with one aspect of the present invention.

Referring to the drawing wherein like reference characters are used for like parts throughout the several views, a personal computer 10 includes a housing 12, a pivotally connected screen 14, a touchpad 16, and a keyboard 18. While the present invention has been illustrated in connection with a portable, notebook computer, it should be appreciated that the present invention is applicable to any type of personal computer system.

A touchpad 16 is located on a space near the bottom of the keyboard 18 so that it is easily accessible to the computer user using the keyboard 18. The portion of the touchpad 16 visible to the user may be a glass 22 which is substantially transparent to infrared light.

Figure 2:
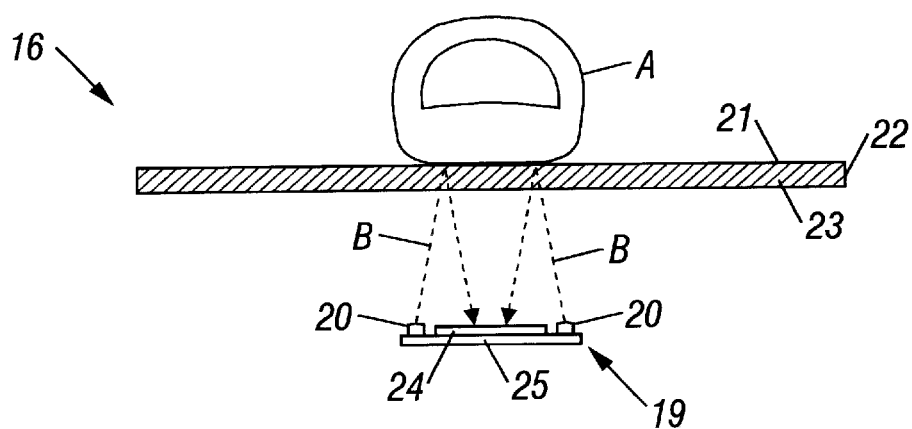
FIG. 2 an enlarged, schematic, cross-sectional view showing one embodiment of the touchpad/security device of the present invention.

As shown in FIG. 2, the touchpad 16 includes an infrared source/detector 19 that includes a plurality of infrared sources 20 and an infrared detector 24 mounted on a substrate 25. The substrate 25 may, for example, be a printed circuit board which mounts electronic components necessary for the operation of infrared source/detector 19 as well as the actual detector 24 and sources 20.

The infrared sources 20 may be infrared light emitting diodes which direct infrared light towards the undersurface 23 of the glass 22. The number of infrared sources 20 will be determined by the characteristics of particular implementations; however, in one exemplary embodiment it would be advantageous to have a set of four infrared sources 20 arranged in a diamond shape, each directed generally to one of four quadrants of the undersurface 23 of the glass 22.

The infrared detector 24 is advantageously positioned centrally with respect to the infrared sources 20. The infrared detector 22 may conveniently be implemented by a conventional charge-coupled device ("CCD") infrared detector made up of a plurality of integrated infrared sensors. Again, the number of infrared sensors is determined by the amount of information which is necessary in particular circumstances and can be readily determined by those skilled in the art.

As illustrated in FIG. 2, the user may position his or her finger, as indicated at "A", on the upper surface 21 of the glass 22. Advantageously, the glass 22 is sufficiently transparent to infrared radiation to avoid adversely detracting from the effective operation of the present invention. The infrared sources 20 direct infrared light, indicated as "B" in FIG. 2, upwardly towards the undersurface 23 of the glass 22. When the user's finger is present, as indicated at "A", the infrared light is reflected back to the detector 24. Thus, by appropriately angling the sources 20 with respect to the detector 24, information can be obtained about the presence, absence and characteristics of any object positioned on top of the glass 22.

Figure 3:
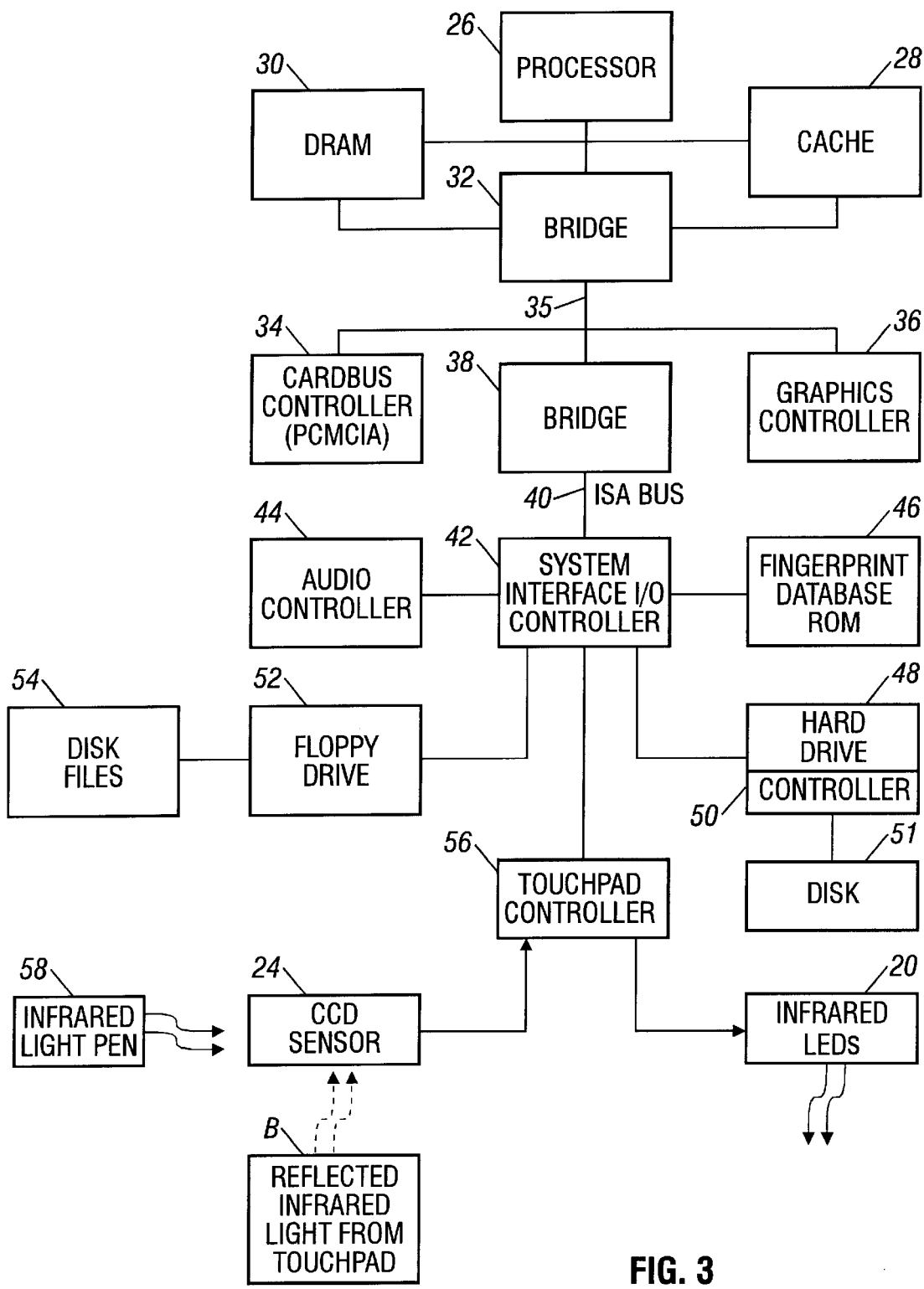
FIG. 3 is a block diagram showing one embodiment of the hardware for implementing the present invention.

Referring to FIG. 3, a computer system 10 for implementing the present invention may include a processor 26 which may be any suitable microprocessor. The processor 26 is connected to a cache 28 and memory 30 which may be implemented by dynamic random access memory ("DRAM"). The processor 26 connects by a host bus to a bridge 32.

The bridge 32 in turn connects to the bus 35. The bus 35 connects to a card bus controller 34, which may be used to implement a PCMCIA card system, and a graphics controller 36. The bridge 32 also connects to the bridge 38 over the bus 35. The bridge 38 connects to a bus 40, which may be, for an example, an Industry Standard Architecture ("ISA") bus.

The bridge 38 connects via the bus 40 to a conventional system interface/input/output controller 42. The controller 42 may control, for example, an audio controller 44, a floppy drive 52, a fingerprint database ROM 46, and a hard disk drive 48. However, any number of conventional input/output devices may be connected to the input/output controller 42. Finally, the controller 42 connects to the touchpad controller 56.

The touchpad controller 56 controls the infrared sources 20 and the infrared detector 24. Namely, digital information from the detector 24, which may be a charge-coupled device ("CCD"), may be processed by the touchpad controller 56. The CCD detector 24 may receive information from an infrared light pen 58 or from reflected infrared light, indicated as "B" in FIGS. 2 and 3, from an object on the touchpad 16.

The touchpad controller 56 processes the inputted infrared information and produces signals indicative of either the position of the user's finger on the glass 22 or information about the user's fingerprint. For example, in a first mode, at least one infrared source 20 may scan a user's finger, conveniently positioned at a central location on the touchpad 16, to provide information about the user's pattern of skin ridges on the user's finger tip. This information can be used to do a fingerprint analysis.

In a second mode of operation, the user simply positions his or her finger on the touchpad 16 and moves his or her finger thereon to implement cursor control. Namely, the user's finger movements are detected and used to generate corresponding movements of the cursor 27 on the screen 14.

Since the signals from the CCD device 24 are consistent with conventional touchpad signals, such as those from capacitive touchpads, the operation of the touchpad controller 56 is generally similar to that of conventional touchpad controllers. Moreover, its output is in a form generated in connection with a conventional touchpad controller such as a mouse, capacitive touchpad, rollerball touchpad and the like.

The touchpad controller 56 also produces signals to the infrared sources 20 to cause them to emit a pattern of infrared light which may be reflected off any object on the detector 16. This operation may be implemented in response to an appropriate input on the keyboard 18. When the user implements the key entry, the infrared light sources 20 are operated to display a pattern of light. When the user positions his or her finger on the glass 22, the reflected infrared light is processed by the CCD detector 24. Based on the reflected energy, the position of the user's finger can be triangulated. In this regard it may be desirable, in some instances, to have each of the sources 20 emit a slightly different wavelength or frequency of light so that the energy which is emitted from each of the sources 20 and reflected back from an object on the glass 22 can be separately identified to aid in triangulating the position of the object.

In one mode of operation, wherein finger position scanning is utilized, all of the sources 20 may be utilized. In the other previously discussed mode, involving fingerprint identification, it may be desirable to use less than all of the infrared sources 20 and to operate them at a frequency and wavelength which is sensitive to the user's finger skin ridge patterns.

In accordance with still one additional mode of operation, an infrared light source may be shined through the glass 22 to be picked up by the detector 24. For example, a light pen 58, which will be described in more detail later, can be utilized for this purpose.

The finger location or fingerprint information is transmitted by the touchpad controller 56 to the system interface/input/output controller 42. The controller 42 may access a fingerprint database memory 46 in order to compare the information inputted by the user to the information stored in the memory 46. In this way, for example, fingerprint identification information previously stored in the memory 46 can be compared to that of the current user to determine if access is appropriate and, if so, what level of data/resource access should be provided.

For example, a hard disk drive 48 with a controller 50 and a floppy drive 52 may be accessable by certain users identified in the memory 46 and not by others. The controller 42 may issue a signal indicative of the identity of the user. This information is then analyzed to access information stored on either a hard disk associated with the hard disk drive 48 or the disk file 54 associated with the floppy drive 52 to determine whether to permit access to particular information contained in the storage medium.

If information which the user wishes to access is not stored within the areas covered by the user's security clearance, the storage medium denies access. Moreover, if, for example, a thief has stolen the storage medium, such as a hard disk drive 48 or the floppy drive 52, and attempts to access it on a separate computer, this would not be possible. This is because the floppy drive 52 or the controller 50 deny access unless they receive an appropriate identification code from the controller 42 for an authorized user as a result of a fingerprint analysis. In this way, both hardware and data security may be implemented.

Figure 4:
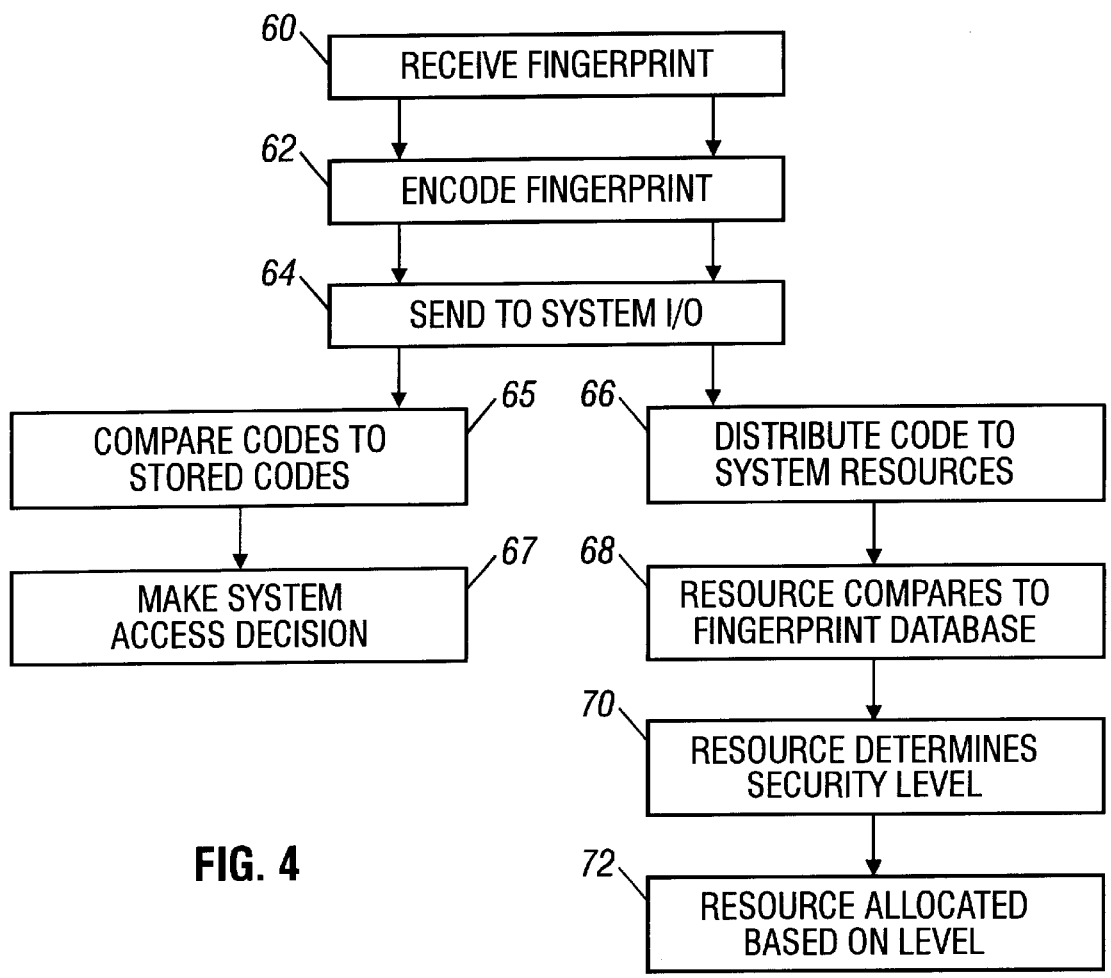
FIG. 4 is a flow chart illustrating one embodiment for implementing the present invention.

Referring to FIG. 4, the operation and programming of the system 10 with respect to the security subsystem is illustrated. Initially, a fingerprint must be received, as indicated by the block 60, by causing the user to position his or her finger on the glass 22, advantageously at a centrally indicated location on the glass 22. One or more of the infrared sources 20 are caused to direct beams of infrared light of appropriate frequency and wavelength to permit analysis of the user's finger ridge patterns and to develop fingerprint information.

Next, the fingerprint information is encoded by the touchpad controller 56. This coded information is sent to the system I/O controller 42 as indicated in block 64. The I/O controller 42 may distribute the information to various subsystems and resources as indicated at block 66. The controller 42 may also itself compare the coded information with its own database medium, as indicated at 46 in FIG. 3. Thus, the system 10 may decide whether or not the user should have any access to the computer system. If not, the system will be shut down as indicated in the block 67.

In addition, the I/O controller 42 distributes the coded fingerprint information to various resources, such as the hard drive 48 and hard drive controller 50 and the floppy drive 52, as indicated in the block 66 in FIG. 4. Each resource then compares the fingerprint code to its own database of authorized fingerprint users, as indicated in the block 68. The resource may, if it is a storage medium, store the fingerprint information on itself, for example, on a disk 51 in the case of a hard disk drive 48, or disk files 54 associated with a floppy drive 52. The comparison may be performed, for example, by the controller 50 of a hard disk drive or the floppy drive 52 itself. Other resources may store this information in an appropriate memory.

Particularly where the resource is removable from the computer system, it is advantageous to have a security subsystem on the resource itself. In this regard, it is advantageous to have both the memory for storing user identification information and the comparator for comparing that information to the user identification information of the current user on the removable resource itself.

In the case of the hard disk drive 48, the controller 50 can compare the user identity information to a stored list of authorized users. If the user is on the stored list of authorized users, code is generated which indicates what areas of the resource are accessible by the user. Particular users may have access to files, sectors, or other subdivisions of the information stored on the resource. The user is only permitted access to the authorized information as indicated in the blocks 70 and 72.

Figure 5:
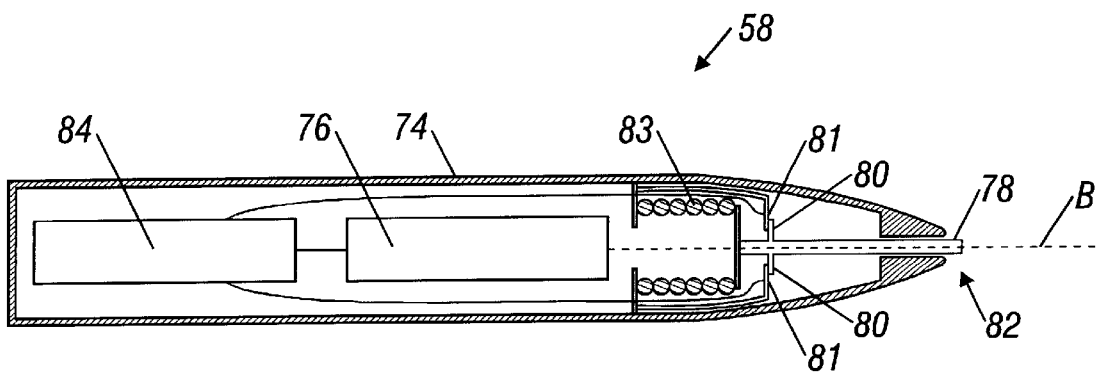
FIG. 5 is a schematic, cross-sectional view of an infrared input/output device in accordance with one aspect of the present invention.

Referring now to FIG. 5, the infrared light pen 58 includes a housing 74, with a tip 82. A substantially infrared transparent cylinder 78 is reciprocatable within the tip 82. The cylinder 78 includes a pair of contacts 80 which mate with contacts 81 on the housing 74. The inward reciprocation of the cylinder 78 completes an electrical switch through the contacts 80 and 81. A coil spring 83 may be provided to bias the member 78 outwardly.

Inside the housing 74, a battery 84 may be connected to an infrared source 76. The source 76 produces a beam of infrared light "B" which passes through the cylinder 78. Rearward reciprocation of the cylinder 78 completes the contacts 80 and 81 operating the infrared detector 76. When the contacts 80 and 81 are closed, the infrared sensor 76 is turned on, causing a beam of infrared light to be emitted.

Thus, the user may use the pen 58 to write or otherwise press against the glass 22. As a result, infrared light is generated which is detected by the detector 24. The infrared source 76 may generate light of a unique frequency or wavelength such that the detector 24 can recognize that the detected light is from the pen 58 and not reflected light from sources 20. The pen 58 may be utilized to input a variety of information including written information simply by writing on the touchpad 16. Because the source 76 only operates when the tip 82 is pressed against a surface, the life of the battery 84 is substantially extended.

The stroke width of the pen 58 represented by the computer could be adjusted by varying the diameter of the infrared light beam produced at the tip 82. Since infrared light is not visible, the use of the pen would not be a distraction for users.

With the present invention an advantageous security system may be implemented and, if desired, at the same time, an advantageous infrared cursor control system may be also implemented. The implementation of both features with common hardware should provide significant cost savings, resulting in economies that can make the overall system even more practical.

While the present invention has been described with respect to a limited number of embodiments, those skilled in the art will appreciate a number of variations and modifications therefrom. It is intended that the appended claims cover all such variations and modifications that fall within the true spirit and scope of the present invention.

I claim as my invention:

1. A personal computer system comprising:
   a processor and a memory connected to one another;
   a keyboard connected to said processor; and
   a touchpad on said keyboard, said touchpad including a substantially infrared transparent surface, a plurality of sources of infrared light connected to emit at different frequencies or wavelengths on at least some occasions, and a detector of infrared light, said source arranged to direct infrared light through said touchpad surface from below and said detector arranged to detect infrared light reflected from said surface when an object is placed on said surface, said detector connected to said processor such that said processor may analyze information about the object placed on said surface.

2. The computer system of claim 1 including a controller connected to said infrared light detector, said controller adapted to generate signals indicative of the position of an object on said surface.

3. The computer system of claim 2 wherein said detector includes a charge-coupled device infrared light detector, and said infrared source includes a plurality of light emitting diodes arranged to direct infrared light at said surface.

4. The computer system of claim 1 wherein said computer system includes a display screen and a cursor display system for displaying a cursor image on said screen, the position of said cursor being controllable by the user's finger movements on said surface.

5. The computer system of claim 4 including a device for positioning a cursor image on said screen, said device connected to receive input signals from said controller indicative of the position of the user's finger on said surface, said device arranged to produce cursor images on said screen in accordance with the movements of the user's finger.

6. The computer system of claim 1 wherein said infrared detector is connected to a device which produces signals indicative of the pattern of ridges on a user's finger.

7. The computer system of claim 6 wherein said device includes a comparator and a storage medium for storing signals indicative of user fingerprints, said comparator adapted to compare a user's fingerprint inputted by said detector with stored fingerprint information to determine the identity of the user.

8. The computer system of claim 7 wherein said computer system is adapted to deny access to said system unless said comparator finds a match with the user's fingerprint.

9. The computer system of claim 8 including at least one data storage medium including means for receiving information about an intended user's fingerprint, means for comparing that information to information stored in said storage medium, and means for granting access to said storage medium based on the results of said comparison.

10. The computer system of claim 9 wherein said storage medium is a hard disk drive having information about a potential user's fingerprints stored in said hard disk drive and having a controller including said comparator.

11. The computer system of claim 9 wherein said storage medium is a floppy disk drive including disk files which contain information about a potential users's fingerprints.

12. The computer system of claim 9 wherein said storage medium includes information not only about potential authorized users but also about the particular information stored in said medium that a particular user is authorized to access.

13. The computer system of claim 9 wherein said storage medium is operable only when information inputted about a potential user's fingerprint matches information contained in said storage medium about authorized computer users.

14. The computer system of claim 6 wherein said infrared detector and said controller are adapted to analyze the position of a user's finger on said surface, said computer system including a display screen and cursor control device for controlling the position of a cursor image on said screen.

15. A computer system comprising:
   a sensor capable of sensing both the position of the user's finger on a surface and the characteristics of the user's fingerprint;
   a cursor control for controlling the position of a cursor, said cursor control connected to said sensor for receiving information about the location of the user's finger on said surface, and
   a fingerprint analyzer connected to said sensor for receiving information about the characteristics of the user's fingerprints;
   wherein multiple frequencies or wavelengths are used when said sensor is used for detection of position, but not when said sensor is used for receiving information about the characteristics of the user's fingerprint.

16. The computer system of claim 15 wherein said sensor is a detector of infrared light.

17. The computer system of claim 16 including an infrared light source, wherein said surface is substantially transparent to infrared light, said sensor arranged to receive infrared light from said source reflected by an object on said surface.

18. The computer system of claim 17 wherein access to said computer system is controlled by said fingerprint analyzer, said analyzer including stored information about characteristics of the fingerprints of authorized system users.

19. A method of inputting information to a computer system comprising the steps of:
   producing infrared light;
   causing said infrared light to be reflected from a user's finger positioned on a surface;
   analyzing the reflected infrared light to determine the location on said surface of the user's finger and the characteristics of the user's fingerprint;
   controlling the position of a cursor on a display screen based on the finger location information; and
   controlling access to said computer system based on the fingerprint information;
   wherein said infrared light is selectively produced in either a single wavelength when the characteristics of a fingerprint are being analyzed, or in multiple wavelengths when determining the location of the finger.

20. The method of claim 19 including the steps of comparing the fingerprint information to stored fingerprint information of authorized users and granting access to said system if a match is found between the analyzed fingerprint information and the stored information.

21. The method of claim 20 including the step of controlling the operation of a storage medium associated with said computer system based on said fingerprint information.

22. The method of claim 21 including the step of storing information about authorized users of said storage medium in said storage medium.

23. The method of claim 22 including the step of controlling access to information stored in said storage medium based on said fingerprint analysis.

* * * * *